(12) United States Patent
Sjötun

(10) Patent No.: US 6,230,751 B1
(45) Date of Patent: May 15, 2001

(54) CORROSION- AND FIRE-RESISTANT PIPE SYSTEM

(75) Inventor: Kyrre Sjötun, Kongsberg (NO)

(73) Assignee: Trelleborg Viking AS (NO)

( * ) Notice: Subject to any disclaimer, the term of this patent is extended or adjusted under 35 U.S.C. 154(b) by 0 days.

(21) Appl. No.: 09/269,554

(22) PCT Filed: Aug. 28, 1998

(86) PCT No.: PCT/SE98/01529

§ 371 Date: Mar. 30, 1999

§ 102(e) Date: Mar. 30, 1999

(87) PCT Pub. No.: WO99/11960

PCT Pub. Date: Mar. 11, 1999

(30) Foreign Application Priority Data

Aug. 29, 1997 (SE) .................................................. 9703109

(51) Int. Cl.[7] .................................................... F16L 9/14
(52) U.S. Cl. .................. 138/153; 138/155; 138/109; 138/DIG. 8; 169/16; 239/209
(58) Field of Search .................................... 138/126, 127, 138/129, 130, 133, 138, 153, 92, 109, 155, DIG. 8; 169/16, 17; 239/208, 209

(56) References Cited

U.S. PATENT DOCUMENTS

| | | | |
|---|---|---|---|
| 215,481 | * 5/1879 | Rider | 138/109 |
| 1,520,048 | * 12/1924 | Baird | 138/126 |
| 1,559,861 | * 11/1925 | Flower | 138/92 |
| 2,143,852 | * 1/1939 | Anderson | 138/130 |
| 3,420,276 | * 1/1969 | Skinner et al. | 138/127 |
| 3,642,034 | * 2/1972 | Ullman et al. | 138/144 |
| 3,866,633 | * 2/1975 | Taylor | 138/138 |
| 3,901,281 | * 8/1975 | Morrisey | 138/153 |
| 3,972,354 | * 8/1976 | Champleboux et al. | 138/133 |
| 4,106,968 | * 8/1978 | Kutnyak et al. | 138/DIG. 8 |
| 4,153,080 | * 5/1979 | Murray, Jr. et al. | 138/126 |
| 4,205,034 | * 5/1980 | Newberry | 138/DIG. 8 |
| 4,372,493 | * 2/1983 | Smith | 239/208 |
| 4,453,155 | * 6/1984 | Cooper | 169/16 |
| 4,488,577 | * 12/1984 | Shilad et al. | 138/127 |
| 4,522,235 | * 6/1985 | Kluss et al. | 138/132 |
| 4,585,035 | * 4/1986 | Piccoli | 138/126 |
| 5,244,016 | * 9/1993 | Kuroda et al. | 138/DIG. 8 |
| 5,348,045 | * 9/1994 | Serve | 138/153 |
| 5,853,030 | * 12/1998 | Walding | 138/155 |

FOREIGN PATENT DOCUMENTS

| | | |
|---|---|---|
| 1247771 | 8/1967 | (DE) . |
| 1650142 | 9/1970 | (DE) . |
| 2348401 | 11/1977 | (DE) . |
| 503208 | 4/1996 | (SE) . |

* cited by examiner

*Primary Examiner*—James Hook
(74) *Attorney, Agent, or Firm*—Burns, Doane, Swecker & Mathis, L.L.P.

(57) ABSTRACT

A corrosion-resistant and fire-resistant pipe system suitable for sprinkler systems and the like in the offshore industry and also on military and civilian seagoing vessels, and generally as sprinkler systems in official buildings and in industrial buildings. The pipe system is characterized in that the pipe system includes rigid and cold-formable pipe sections (10) that have one or more tubular rubber layers (11, 13, 15) and reinforcement layers (12, 14) that surround or embrace one or more of the tubular rubber layers (11, 13, 15). The reinforcement layers are comprised of wires or ribbons that have been wound, braided, knitted or formed in some other way so as to cross each other, wherein each of the wires or ribbons defines with the longitudinal axis of the pipe section a winding or spiraling angle that imparts the greatest possible strength to the reinforced, tubular rubber layers (11, 13, 15). In the present case, the system also includes branch connections (18) for connecting a pipe section (10) to another pipe section in a multi-path coupling.

17 Claims, 2 Drawing Sheets

CORROSION- AND FIRE-RESISTANT PIPE SYSTEM

The present invention relates to a corrosion and fire-resistant pipe system suitable for sprinkler systems and the like in offshore industries and on both military and civilian seagoing vessels and also as sprinkler systems in public buildings and industrial buildings.

Conventional steel pipe systems are not suitable for transporting liquids that are as aggressive as sea water and industrial waste solutions and other, similar waste liquids. In offshore industries for instance where sea water pipelines are required to a great extent for cooling and fire extinguishing purposes (sprinkler systems), the replacement of traditional steel qualities with other, hopefully more suitable materials has been pursued for quite some time. In this regard, efforts have been made to switch to more expensive metallic materials, such as steel qualities that are more highly alloyed, e.g. SMO steel which is an acid-proof Cr—Ni steel that contains about 6% Mo, and more sophisticated metals or alloys, for instance titanium and different Cr—Ni alloys.

Tests have also been made with plastic materials, wherein fibreglass-reinforced epoxy pipes have been tested as line pipes for conducting sea water. Although such plastic pipes have significant advantages over steel pipes with regard to their corrosion resistance, they are unsuitable as replacements for steel pipes in all applications and primarily within the offshore and seagoing vessel sector, for other reasons. For instance, such pipes are not fire-resistant, but, on the contrary, inflammable and combustible and therefore generate smoke and toxic gases and need to be provided with separate fire insulation even in simple applications. Plastic pipes also have a limited mechanical resistance, for instance against external blows and knocks and against so-called water hammer that occur with abrupt, powerful pressure changes of the water in the pipe system, caused, for instance, by the closing and opening of valves, which is, of course, also a significant disadvantage in many contexts. Metallic pipes also have poor resistance against water hammer due to their inability to expand quickly.

These more expensive metallic materials are far more suited for the purposes in question than plastic pipes, with the exception of their resistance to water hammer as mentioned above. However, since the material is extremely expensive the running metre cost of such material is high and its usefulness is restricted to the most advanced applications and to use in particularly demanding systems. However, all metal-based pipe systems are still encumbered with a number of serious problems. Firstly, none of the tested qualities is completely free from corrosion problems in spite of everything, and exposure to temperatures that are slightly higher than normal room temperatures can have serious consequences. Secondly, these materials require extensive welding work and/or other similar "hot work" when assembling, installing and servicing pipe systems whose pipes are made from such materials, which, from the aspect of safety, is something that one wishes to avoid to the greatest possible extent, particularly in the offshore and ship sector. In addition to the problem presented by the actual heat in such work, there is always the risk of gas leakage in oil and gas recovery systems. It is therefore always necessary to stop production during work which entails the use of open flames or the like in offshore installation work. Naturally, this results in significant costs and also in serious drawbacks and production disturbances.

In the case of fire, different high heat flux densities occur together with high temperatures, depending on the nature of the fire. In the case of a difficult fire that involves the combustion of solid fuels, so-called cellulosic fire, the temperature in the region of the fire increases continuously and will be about 900° C. after 60 minutes, about 1050° C. after 120 minutes and a highest temperature of about 1150° C. will be reached after 240 minutes. The heat flux density that prevails at the same time is, on average, about 60 $kW/m^2$, and a maximum heat flux density of about 100 $kW/m^2$ can be reached. In hydrocarbon pool fires or the like, the temperature rises much more rapidly and a maximum temperature of about 1150° C. will be reached after 20 minutes. The heat flux density is much higher than in the case of cellulose fires, on average about 200 $kW/m^2$, with a highest peak of about 225 $kW/m^2$. The worst type of fire is the so-called jet fire, which may occur when natural gas and different condensates burn under high pressure, such as in natural gas reservoirs, either offshore or on land. Offshore platforms and corresponding installations on land can be the subject of such fires and such fires have, unfortunately, occurred with catastrophic consequences and the loss of many lives. In the case of jet fires, the temperature rises very quickly (10–15 seconds) to a magnitude of 1300–1400° C., at which the fire has a typical heat flux density of 360 $kW/m^2$ and limited up to about 500 $kW/m^2$.

Against this background, the recovery of oil and gas offshore and on land places very high demands on fire safety and fire protection, and offshore platforms are thus equipped with advanced sprinkler systems based on pumping large volumes of water from the sea, said systems having branches in all parts of the platforms.

Particularly in the offshore and shipyard industry, there has long been expressed the need for corrosion-resistant and fire-resistant pipe systems that can be used, for instance, on oil platforms, military vessels and oil tankers, where particularly strict and advanced requirements are found with respect to fire resistance and corrosion resistance and where there is a desire to greatly reduce or preferably totally eliminate the need to carry out welding work or other hot work.

The object of the present invention is to provide a corrosion-resistant and fire-resistant pipe system for the most advanced applications and with which the aforesaid problems associated with materials used hitherto are greatly reduced or even totally eliminated in certain cases, and which is also able to afford further important advantages with respect to its installation and re-construction, by using the specific properties of the pipe material used, for instance better cold-forming properties.

The inventive pipe system is characterized to this end by the features set forth in the following Claims. The pipe system thus includes rigid and cold-formable pipe sections or lengths that include one or more tubular rubber layers and reinforcing layers which surround or embrace one or more of said tubular rubber layers and consist of wires or ribbons that are wound, braided, knitted or that are made to cross one another in some other way and each of which defines a winding or spiralling angle with the longitudinal axis of respective pipe sections such as to impart the greatest possible strength to the reinforced, tubular rubber layers and, when applicable, to branch connections for connecting one pipe section to another pipe section in a multi-path coupling. By "rigid and cold-formable pipe sections" is meant here that said sections can only be bent under plastic deformation of the pipe sections. In this context, it is worth mentioning that pipes that can be bent without any plastic deformation are referred to as "hoses" by way of definition.

The reinforcement may be encapsulated in one or more rubber layers or may consist in one or more separate layers between rubber layers. The reinforcing material itself is not critical, since the most important thing in this connection is to achieve the greatest possible stability and strength and also to achieve a high flexural rigidity, or bending resistance, which enables the pipe to deform plastically and which differentiates said pipe from a "hose", as indicated above. It is known from the manufacture of reinforced hose that when the winding angle, or the spiralling angle as it can also be called, i.e. the acute angle that each reinforcing wire or reinforcing ribbon defines with the longitudinal axis of the hose (the pipe), lies within a given, narrow angular range of about 54°, there is obtained a strength, stability and flexural rigidity that is not suitable with respect to a hose, since it would not be possible to bend the product without it being deformed plastically and therewith lose its hose properties as defined above. This angular range must therefore be avoided in such manufacture.

The reinforcement is wound by first placing a layer of wires or ribbons obliquely adjacent one another, so as to define said angle with the longitudinal axis, whereafter there is laid on said first layer a further layer that crosses the first layer but still defines the same angle with the long axis. Braiding is effected in a similar manner, with the exception that the mutually crossing wires are braided in one another, but not fixed to one another at their meeting points. It is also possible, and in many cases simpler, to apply a prefabricated reinforcement in the form of a wire net that includes such an angle between the mutually crossing wires in the net, such that the wire directions define said predetermined angle (~54°) with the longitudinal direction after having placed the net around the tubular rubber layer.

With the intention of imparting the best possible properties to the pipe material in the pipe system, it is preferred that the reinforcement consists of metal or a carbon-fibre composite material, of the Kevlar type. This latter reinforcement material is particularly preferred, since it imparts to the pipe material both the necessary strength, stability and appropriate flexural rigidity and other valuable properties, such as low weight, for instance. The material may conveniently be produced with an outer rubber layer chosen from rubber materials or rubber types that have properties adapted to the specific application for which the pipe material is intended. In addition to being non-inflammable, which is an obligatory property of such rubber material, the rubber may conveniently also be non-toxic or non-smoke forming, or may have a low thermal conductivity. A highly suitable material in this respect is rubber of the type designated VIKING NOFLAME 815 or 915.

The pipe material in the inventive pipe system has been found to have surprisingly good fire resistance, such as to be able to resist a jet fire with a heat flux density of 500 kW/m$^2$ and a flame temperature of about 1400° C. for at least two hours. The material, however, can be given a still higher fire resistance and can be given properties which render the material self-sealing and self-protecting at extremely high heat flux densities, such as in the case of a jet fire, similar to the pipes and hoses described in our co-terminus Patent Application SE-A-9703110-8 with the title "A Tube or Hose Capable of Withstanding Extreme Heat Flux Densities". In this case, the inner rubber layer must be embraced by a perforated casing. This casing may consist of the inner layer of said reinforcing layers, although it may alternatively consist of a separate layer, which does not need to possess the reinforcing properties of the reinforcement layers in accordance with this invention. The holes or perforations in the casing shall lie adjacent one another and have a smallest cross-sectional area that is able to provide a "nozzle effect" under the action of pressurised liquid conducted in the pipe. The cross-sectional area of the perforations is predetermined and is given by the liquid pressure for which the pipe is intended. Reference is made to our co-terminus Patent Application in other respects.

The branch connection for connecting one pipe section to another pipe section in the inventive pipe system is characterized in that it includes a metal or plastic pipe-piece that has an outer flange, a first semi-circular calliper that includes a pipe-piece receiving hole and an outwardly extending part for receiving a flange support, and a corresponding, second semi-circular calliper which, together with the first calliper, is intended to form a ring-shaped joint around the pipe with the aid of appropriate coupling means, and therewith hold the pipe-piece sealingly in place in a hole formed in the pipe in an assembled state. The pipe-piece of said connection may conveniently be provided with a sealing coating on its outer surface downwardly of the flange, which preferably has the form of a nut screwed onto the pipe-piece therewith enabling the position of the flange along the pipe-piece to be adjusted. However, the pipe-piece of said connection may alternatively lack the provision of a separate sealing means on its outer surface.

The pipe material used in the inventive pipe system possesses the good and desirable properties of a metal pipe or a composite pipe and can be cold-formed and thus bent in the absence of heat or need to use special bend tools. The pipe material can also be spliced and joined without being welded or worked in any other way that requires the application of heat. The material is also totally corrosion resistant, even with respect to aggressive liquids and at temperatures above normal room temperature, which is not the case with the metallic materials relevant in this context. This high resistance to corrosion is because the inner side of the pipe is comprised of rubber. The type of rubber used will be chosen largely with respect to the nature of the liquid to be transported in the system.

As before mentioned, there is used in accordance with the invention in hose manufacture the earlier known phenomenon with which the highest possible strength is obtained in a reinforced rubber product when the reinforcement is wound at a given winding angle (spiralising angle) of about 54°, although the product will then loose its hose-characterising ability of being able to bend without plastic deformation. As far as we are aware, this phenomenon has not earlier been proposed for practical use in obtaining rigid and readily cold-deformed plastic flexible "pipes" having the highest possible strength and stability with respect to wire-reinforced products, instead of elastically flexible "hoses". The pipe lengths or sections according to the invention have a stability, strength and bending properties which enables them to rest on and be supported by conventional pipe brackets without sagging to any appreciable extent, and such as to be bent or curved in a cold state to a desired geometric shape when so desired, even without the use of tools to this end, for instance when turning round corners or around other pipes or conduits, and such as to retain their bent shapes.

The stability of the pipe provided by the reinforcement is not affected in any negative way, not even when making holes in the pipe for accommodating branch connections.

The inventive pipe system has a number of advantages over different conventional metallic and other materials hitherto used for pipe systems. Particularly important advantages are given in the following list:

A substantial reduction in weight in relation to metal pipes.

A one-third reduction in the case of steel pipes.

A significant price reduction etc.

Enhanced operational safety due to the absence of corrosion or deposits.

Explosion-proof.

Can withstand external mechanical impacts and internal mechanical impacts resulting from so-called water hammer.

Cheaper and easier to install than metallic pipes.

Easier to transport, by virtue of being able to reel the material on drums.

Safer transport, due to insensitivity to impacts.

Eliminate the need of welding, heating and the like during installation and assembly.

No risk of frost or freezing damage, and thawing can take place without incurring material problems.

Nozzles can be fitted easily.

No requirement of insulating hot and cold pipes.

At least 30 years operating time.

BRIEF DESCRIPTION OF THE DRAWINGS

The invention will now be described in more detail with reference to the accompanying drawings, in which

FIG. 1 illustrates part of a pipe section or pipe length 10 of one embodiment, where both rubber and reinforcement are included in separate layers. The pipe section 10 thus comprises an inner rubber layer 11 made from a type of material adapted to the liquid transported in the pipe. The inner rubber layer 11 is embraced by a first reinforcement layer 12, in the illustrated case a woven wire-net where the wires have a winding angle of about 54° in both wire-directions in the net. The first reinforcement layer 12 is embraced by an intermediate rubber layer 13 whose thickness is normally greater than the thickness of the inner rubber layer 11. The intermediate rubber layer 13 is embraced by a second reinforcement layer 14. Although in the case of the illustrated embodiment, the second reinforcement layer is similar to the first reinforcement layer 12 it may differ from said first reinforcement layer and yet still lie within the concept of the invention, and may be comprised of material different to that from which the first reinforcement layer 12 is made. The second reinforcement layer 14 is embraced by an outermost rubber layer 15 which, similar to the intermediate rubber layer 13, is comprised of a rubber material and rubber type adapted to the user requirements of the pipe system, for instance a high fire resistance and high-temperature insulating capacity, for instance with respect to jet fires.

FIG. 2 is a cross-sectional view of a pipe section 10 that includes a single rubber layer 11 in which two reinforcement layers 12, 14 are incorporated. The pipe 10 includes a hole for receiving a pipe-piece 17 belonging to a connecting device 18. In addition to the pipe-piece 17, the device 18 includes an upper semi-circular calliper 19 that has an outwardly extending portion 20 that has an opening 21 through which the pipe-piece 17 extends. The pipe-piece 17 is prevented from sliding from the calliper 19, by means of a flange 22 that fits in the outwardly extending part 20. In the illustrated case, the flange 22 has the form of a nut. The device 18 also includes a bottom, second calliper 23 which can be connected to the upper calliper 19 by connectors 24, which may consist of nuts and bolts or, alternatively, a snap-locking means. The bottom part 17A of the pipe-piece 17 has on its outer surface a coating 25 which acts sealingly against the wall 26 of the hole 16 when the device 18 is fitted on the pipe 10 by means of the callipers 19 and 23 and the connectors 24.

Figure 1:
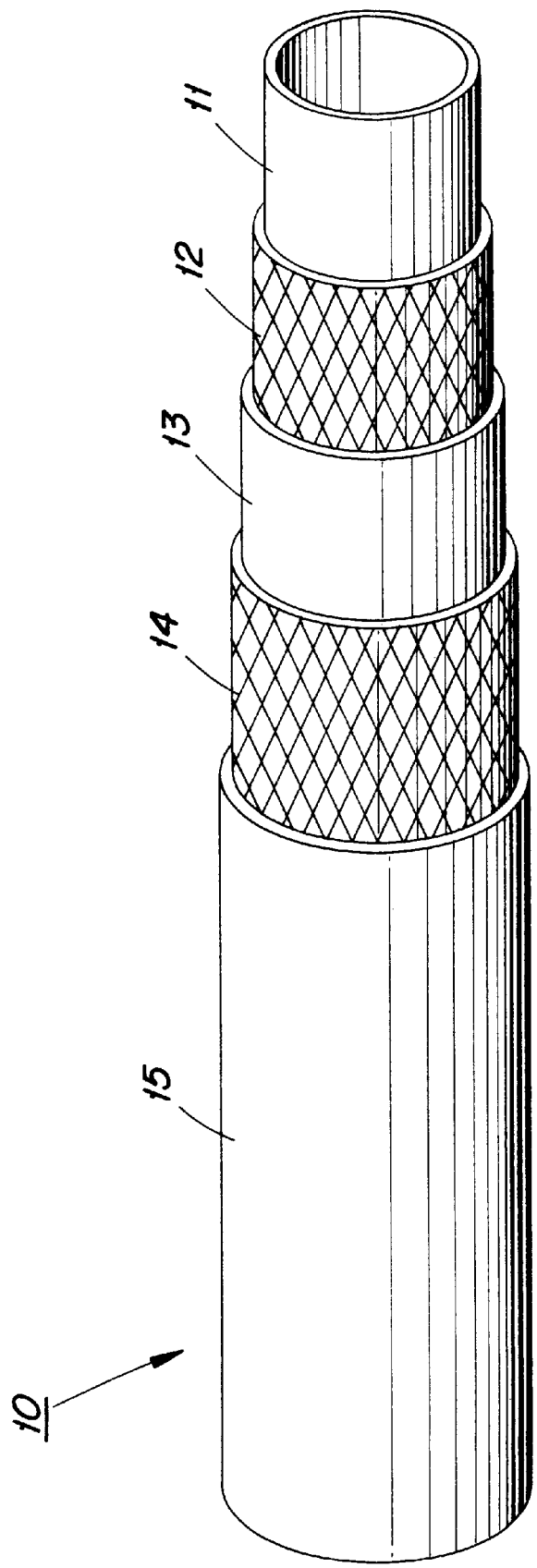
FIG. 1 is a perspective view of one embodiment of the pipe material in the inventive pipe system.
Figure 2:
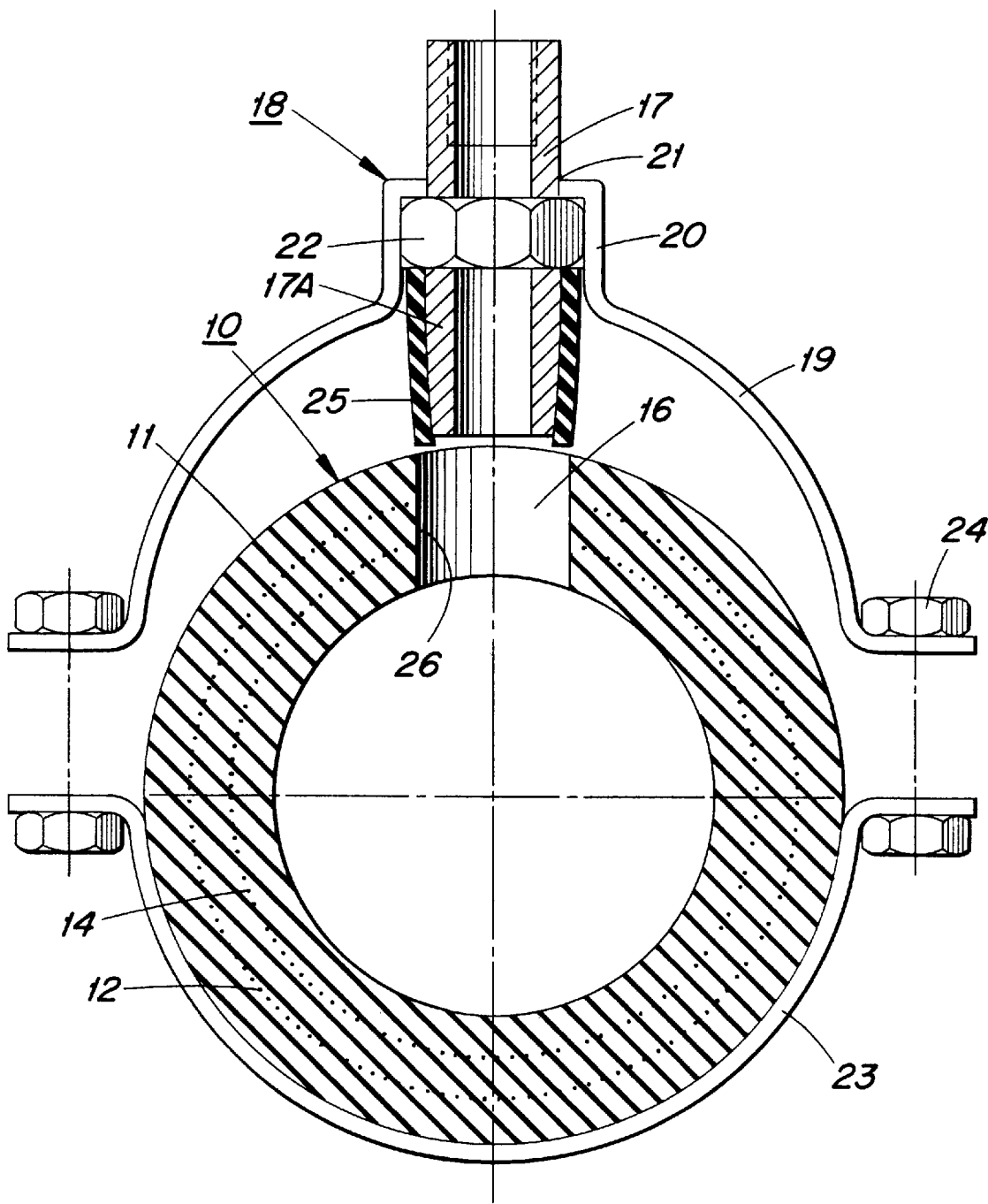
FIG. 2 is a cross-sectional view of a pipe and shows a connecting device used in pipe installation work.

What is claimed is:

1. A corrosion-resistant and fire-resistant pipe system suitable for sprinkler systems and the like in the offshore industry and also on military and civilian seagoing vessels, and generally as sprinkler systems in official buildings and in industrial buildings, wherein the pipe system includes rigid and cold-formable pipe sections that have one or more tubular rubber layers and reinforcement layers that surround or embrace one or more of said tubular rubber layers, where said reinforcement layers are comprised of wires or ribbons that are formed so as to cross each other, and wherein each of said wires or ribbons defines with the longitudinal axis of the pipe section a winding or spiralising angle that imparts the greatest possible strength to said reinforced, tubular rubber layers, and, when applicable, branch connections for connecting a pipe section to another pipe section in a multi-path coupling.

2. A corrosion-resistant and fire-resistant pipe system according to claim 1, wherein the reinforcement is encapsulated in one or more rubber layers.

3. A corrosion-resistant and fire-resistant pipe system according to claim 1, wherein the reinforcement lies as one or more separate layers between said rubber layers.

4. A corrosion-resistant and fire-resistant pipe system according to claim 3, wherein the reinforcement material is comprised of metal wire or carbon-fibre based composite wire.

5. A corrosion-resistant and fire-resistant pipe system according to claim 1, wherein at least one outer rubber layer is comprised of a rubber material or rubber type that has properties adapted for the specific application of the pipe material.

6. A corrosion-resistant and—fire-resistant pipe system according to claim 1, further comprising:

a perforated casing that surrounds the inner rubber layer in contact therewith, wherein said perforated casing may be comprised of one of said reinforcement layers or may be a separate layer, and wherein said perforations have a smallest cross-sectional area chosen to provide a nozzle effect with respect to pressurised liquid in said pipe section and also to impart to the pipe material self-sealing properties even at extreme heat flux densities.

7. A branch connection for connecting a pipe section to another pipe section in the pipe system according to claim 1, wherein said branch connection includes a metal or plastic pipe-piece, a flange mounted on the outside of said pipe-piece, a first semi-circular calliper having a pipe-piece receiving hole and an outwardly extending part for supporting the flange, and an opposing, second semi-circular calliper, wherein said first and said second callipers together form a ring-shaped join around the pipe section, with the aid of suitable coupling means, such as to hold the pipe-piece sealingly in place in a hole provided in the pipe section when said pipe-piece is fitted.

8. A branch connection according to claim 7, wherein the pipe-piece includes a sealing coating on its outer surface downwards on the flange.

9. A branch connection according to claim 7, wherein the flange has the form of a nut screwed onto said pipe-piece, therewith enabling the position of the flange on said pipe-piece to be adjusted and preventing rotation of said pipe-piece.

10. A corrosion-resistant and fire-resistant pipe system according claim 1, wherein the reinforcement material is comprised of metal wire or carbon-fibre based on composite wire.

11. A corrosion-resistant and fire-resistant pipe system according to claim 1, wherein at least one outer rubber layer is comprised of a rubber material or rubber type that has properties adapted for the specific application of the pipe material.

12. A corrosion-resistant and fire-resistant pipe system according to claim 1, further comprising:
   a perforated casing that surrounds the inner rubber layer in contact therewith, wherein said perforated casing may be comprised of one of said reinforcement layers or may be a separate layer, and wherein said perforations have a smallest cross-sectional area chosen to provide a nozzle effect with respect to pressurized liquid in said pipe section, and also to impart to the pipe material self-sealing properties even at extreme heat flux temperatures.

13. A branch connection for connecting a pipe section to another pipe section in the pipe system according to claim 1, wherein said branch connection includes a metal or plastic pipe-piece, a flange mounted on the outside of said pipe-piece, a first semi-circular calliper having a pipe-piece receiving hole and an outwardly extending part for supporting the flange, and an opposing, second semi-circular calliper, wherein said first and said second callipers together form a ring-shaped join around the pipe section, with the aid of suitable coupling means, such as to hold the pipe-piece sealing in place in a hole provided in the pipe section when said pipe-piece is fitted.

14. A branch connection according to claim 13, wherein the flange has the form of a nut screwed onto said pipe-piece, therewith enabling the position of the flange on said pipe-piece to be adjusted and preventing rotation of said pipe-piece.

15. A branch connection according to claim 13, wherein pipe-piece includes a sealing coating on its outer surface towards downwards on the flange.

16. A branch connection according to claim 15, wherein the flange has the form of a nut screwed onto said pipe-piece, therewith enabling the position of the flange on said pipe-piece to be adjusted and preventing rotation of said pipe-piece.

17. A corrosion-resistant and fire-resistant pipe, comprising:
   rigid and cold-formable pipe sections;
   said pipe sections including at least one tubular rubber layer and at least one reinforcement layer that embraces said at least one tubular rubber layer;
   said at least one reinforcement layer being comprised of wires or ribbons that are formed so as to cross each other; and
   wherein each of said wires or ribbons defines with a longitudinal axis of the pipe sections a winding angle which prevents the at least one tubular rubber from being able to bend without plastic deformation.

* * * * *